J. H. BELL.
ANTI-FRICTION JOURNALS.
No. 194,641. Patented Aug. 28, 1877.
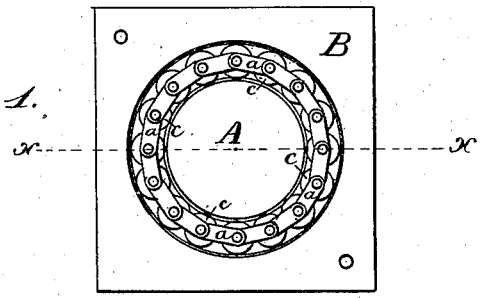
Fig. 1.
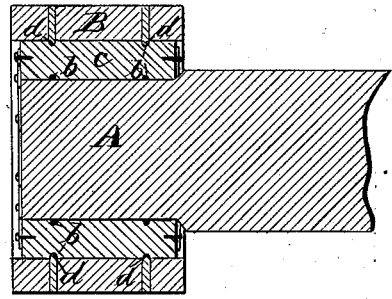
Fig. 2.
Fig. 3.
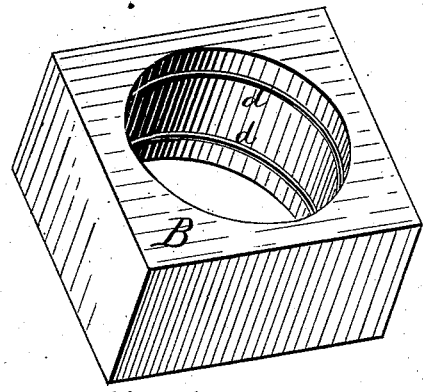
Fig. 4.
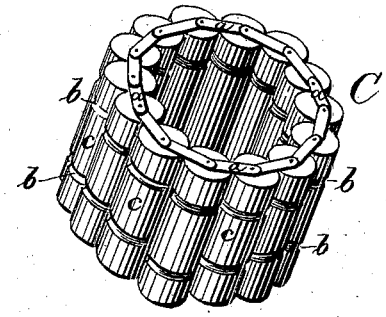
Attest:
E. E. Court.
Jno. P. Brooks.
Inventor:
James H. Bell,
by C. A. Snow & Co.
Attys.

UNITED STATES PATENT OFFICE.

JAMES H. BELL, OF FAYETTEVILLE, ASSIGNOR OF A PART OF HIS RIGHT TO THOMAS MEDEARIS, OF SAME PLACE, JOHN N. SULLIVAN, OF FLAT CREEK, AND DAVID J. NOBLITT, OF BOONEVILLE, TENNESSEE.

IMPROVEMENT IN ANTI-FRICTION JOURNALS.

Specification forming part of Letters Patent No. 194,641, dated August 28, 1877; application filed June 13, 1877.

*To all whom it may concern:*

Be it known that I, JAMES H. BELL, of Fayetteville, in the county of Lincoln and State of Tennessee, have invented certain new and useful Improvements in Anti-Friction Journals; and I do hereby declare that the following is a full, clear, and exact description thereof, which will enable others skilled in the art to which it appertains to make and use the same, reference being had to the accompanying drawings, which form a part of this specification, and in which—

Figure 1 is an end view of a shaft and box equipped with my improved friction-rollers. Fig. 2 is a sectional view of the same on the line $x\ x$ in Fig. 1. Fig. 3 is a perspective view of the journal-box, the shaft and rollers having been removed. Fig. 4 is a perspective view of a set of rollers detached.

Similar letters of reference indicate corresponding parts in all the figures.

This invention relates to that class of devices which are used for the purpose of lessening the friction between shafts and the journal-boxes in which they have their bearings; and it consists in the construction and arrangement of the rollers used for this purpose and the correspondingly modified construction of the journal-boxes, as I shall now proceed more fully to describe.

In the drawings, A is the shaft, and B is one of the boxes in which it is journaled. The inside diameter of the latter is so much larger than the shaft as to admit of the insertion of the band C of rollers $c\ c$. The construction of this will be easily understood by reference to Fig. 4 of the drawings, from which it will be observed that the rollers $c\ c$ are united by plates $a\ a$, pivoted to the ends thereof, thus forming an endless chain or band.

Each of the rollers $c$ has one or more circumferential grooves $b\ b$, and the inside of the box B has corresponding circumferential flanges, $d\ d$, which, when the rollers and shaft are once in position, prevent the former from working out when the shaft is in operation.

From the above description, and by reference to the drawings, the advantages of my invention will be readily understood. The friction caused by the revolution of the shaft is so greatly reduced as to render it more easily operated, while the heating of the box becomes impossible, partly from the reduction of friction, and especially because the open spaces between the rollers $c$, shaft A, and box B, permit the free circulation of air. Lubricating material is scarcely required, and if at all, in very limited quantity.

Finally, the flange $d$ upon the inside of the box, working in the grooves in the rollers, prevents these from working out, thus enabling my device to be used upon slanting with the same good results as upon horizontal shafts.

My invention further has the advantages of being easily adjusted, and cheap of construction.

I am aware that it is not new, broadly, to employ pivoted rollers for the purpose of lessening the friction between a shaft and its journal-box. The custom, however, has been to pivot the said rollers in circular plates or rings, and not, as above set forth, to unite them by links or plates. This, when grooved rollers and a flanged box has been used, (for the purpose of preventing the rollers from working out,) has been objectionable, inasmuch as it would prevent the removal of the rollers for repairing or other purposes, even after the shaft was removed, without first cutting or breaking the rings in which the rollers were pivoted. By linking the rollers together by the plates $a$, as above set forth, the rollers may, when the shaft is removed, readily be taken out of the box, by folding the band together, so that its removal will not be prevented by the flange or flanges $d$.

Having thus described my invention, I claim and desire to secure by Letters Patent of the United States—

The improved anti-friction device herein described, consisting of the box B, having flanges d, rollers c, having grooves b, and united by plates a, so as to form an endless band, C, and shaft A, all combined and operating substantially in the manner and for the purpose herein shown and specified.

In testimony that I claim the foregoing as my own I have hereto affixed my signature in presence of two witnesses.

JAMES H. + BELL.
his mark.

Witnesses:
G. B. McKENZIE,
H. D. MEDEARIS.